United States Patent Office 2,865,939
Patented Dec. 23, 1958

2,865,939

SYNTHESIS OF ALKYLHALOSILANES

Ernest L. Little, Jr., and Miller C. Nelson, Wilmington, Del., assignors to E. I. du Pont de Nemours and Company, Wilmington, Del., a corporation of Delaware No Drawing. Application July 10, 1956
Serial No. 596,843

10 Claims. (Cl. 260—448.2)

This invention relates to a new process for preparing organo-silicon compounds and more particularly to a method of preparing alkylhalosilanes. It is also concerned with novel long-chain alkylhalosilanes.

Alkylhalosilanes have recently acquired considerable industrial importance. These products are very reactive and can be hydrolyzed to yield adjuvants for petroleum oils, coating materials for films, and after-treating agents for fabrics. Alkylhalosilanes available at present, however, generally contain only one to two carbon atoms in the alkyl chain.

Many methods have been proposed for the manufacture of alkylhalosilanes but each has one or more shortcomings. The methods may, for example, be of limited application, use expensive raw materials, be difficult to manipulate, or give low yields of the desired alkylhalosilanes. In addition, they do not readily produce long-chain or high molecular weight alkylhalosilanes.

In one known process, powdered silicon containing copper powder is reacted with methyl chloride at an elevated temperature to produce a mixture of methylchlorosilanes. With alkyl chlorides of longer chain length, this process gives low yields of alkylchlorosilanes and forms undesirable decomposition products.

The Grignard synthesis has also been used for preparing alkylchlorosilanes. This synthesis possesses the disadvantage that it requires either inflammable or rare solvents, exclusion of moisture from the reacting system, and the disposal of by-product magnesium salts.

Alkylchlorosilanes have been prepared, additionally, by adding olefins to silicochloroform at elevated temperatures and pressures. This process is of limited use in bringing about the addition of more than one organic group to the silicon atom.

Another method of preparation utilizes the reaction of an organic chloride and silicon tetrachloride with a suspension of sodium in a liquid hydrocarbon. This process gives a mixture of products including compounds with the Si—Si bond instead of the desired C—Si bonds.

A general object of this invention is, accordingly, to provide a novel and useful method for producing long-chain alkylhalosilanes.

A further object is provision of a method for synthesizing alkylhalosilanes which avoids the defects of the prior art.

Another object is provision of useful, long-chain alkylhalosilanes which have not been prepared heretofore.

The above-mentioned and yet further objects are achieved in accordance with this invention by a process which broadly comprises heating together, at a temperature of at least 225° C. and at a pressure of at least 150 atmospheres, (1) an olefinic hydrocarbon, (2) a silicide of an alkali or alkaline earth metal, and (3) a halide of a metal of the formula $MX_nR_{4-n}$, where M is an element of group IV of the periodic system having an atomic number of from 14 to 50, inclusive, X is a halogen of atomic number 17 to 53, inclusive, R is a hydrocarbon radical, and $n$ is an integer from 1 to 4 inclusive.

In the preferred form of the invention the prcoess is conducted in the temperature range of 225° to 400° C. and at a pressure of 200 to 500 atmospheres, with an olefinic hydrocarbon of 2-8 carbon atoms, a silicide of sodium, calcium or magnesium, and a metal halide of the formula $MX_nR_{4-n}$ where M is silicon or titanium, X is chlorine, R is a hydrocarbon radical of 1–6 carbon atoms, inclusive, and $n$ is an integer from 1 to 4, inclusive.

The physical manipulations required for carrying out the process are very simple. The components are mixed at temperatures low enough to condense the olefin and then heated under autogenous pressure. Alternatively, the halide and silicide are placed in a pressure reaction vessel and the olefin fed thereto under pressure as the vessel is heated to the desired temperature.

The principal variables connected with the process are the reactants and their quantities, the pressure, the temperature, and the time of the reaction.

Many reactants are useful in this process. The olefin employed has preferably 2–8 carbon atoms and but one point of ethylenic unsaturation, i. e., one carbon-to-carbon double bond. The olefin may, however, be either cyclic or non-cyclic. Suitable olefins include ethylene, isopropylene, butene-1, butene-2, isobutylene, the pentenes, the hexenes, and others up to and including the octenes. Usable cyclic olefins include cyclopentene, cyclohexene, and methylcyclohexene.

The metal silicide may, in general, be any one of the alkali or alkaline earth metal silicides. These silicides include those of sodium, lithium, potassium, cesium, calcium, magnesium, beryllium, and strontium. The silicides of the common metals, sodium, calcium and magnesium, are preferred.

Usable halides of the quadrivalent or group IV metals include the inorganic chlorides, bromides, and iodides of silicon, titanium, zirconium, germanium, and tin. Substituted or organic halides of these metals are also usable including methyltribromosilane, dimethyldibromosilane, phenyltrichlorosilane, diphenyldichlorosilane, dipropyldichlorosilane, tricyclohexyliodosilane, and many others. Preferably, R of the formula $MX_nR_{4-n}$ is a hydrocarbon radical with 1–6 carbon atoms and may be saturated aliphatic or aromatic. The saturated aliphatic groups may be straight- or branched-chain or cyclic.

The quantities of each reactant used in the process may vary over a wide range. The metal-containing halide is generally used in excess since it serves as a reaction medium as well as a reactant in the process. The metal silicide enters into the reaction and should be supplied in sufficient quantity to provide a good yield of the alkylchlorosilanes. The mole ratio of silicide to metal halide may be as low as 0.1 and as high as 1. The quantity of olefin may also vary over a wide range, although the mole ratio of olefin to silicide will generally not be less than 1 or higher than 10.

The olefins and metal halides, such as silicon tetrachloride, the methylchlorosilanes and titanium tetrachloride, used in this process are commercially available materials. The preparation and properties of sodium silicide, the preferred silicide, are described by Hohmann in Zeit. anorg. u. allgem. Chem. 257, 113–26 (1948). Other silicides may be prepared by similar or other known syntheses. A typical preparation of sodium silicide is given in one of the examples below.

The time employed in the reaction of the invention may vary between about 4 hours and 48 hours. The longer reaction times within this period favor increased yields and chain lengths but additional time serves little purpose.

A temperature of at least 225° C. is required to accomplish the reaction with up to about 500° C. being usable. As noted, 225°–400° C. is preferred. Within the preferred range, higher temperatures generally result in an increase in yield of the alkylhalosilanes. In comparable reactions run at 250° C. and 350° C., the yield of high boiling alkylchlorosilanes was 32.6 parts at 250° C. and 48.8 parts at 350° C.

Pressures above about 150 atmospheres are needed, higher pressures resulting in increased yield of alkylchlorosilanes. Thus yields, in parts by weight, of high boiling alkylchlorosilanes obtained at 200, 300, and 400 atmospheres under otherwise comparable conditions were, respectively, 23.1, 56.0 and 50.0.

The liquid residues obtained as one of the principal products in the process of this invention are mixtures of high-boiling, long-chain alkylhalosilanes whose average molecular weight lies between about 450 and about 2200. The silicon contents of the liquid residues are between about 1.3% and about 5.0% by weight. They react with water to form chlorine-free, viscous liquids soluble in benzene or ether. Since the hydrolyzed products are chlorine-free, the compounds are believed to contain —$SiCl_2$— groups.

The mechanism of the reaction is not clear. The silicon present in the alkali or alkaline earth metal silicide enters into the reaction, as shown by the result obtained when titanium tetrachloride is used. The long alkyl chains attached to the silicon in the liquid residues may result from partial polymerization of the olefin prior to reaction with the other components in the process. Alternatively or additionally, initial reaction of some of the olefin with the silicide may occur to yield products which then react further with the olefins to build up the alkyl chain length. Hydrogen required to balance the reaction is obtained from the olefin.

The following examples are submitted to illustrate, but not to limit, various aspects of the invention. In these examples quantities of materials are given in parts by weight, superatmospheric pressure in atmospheres, and subatmospheric pressures in mm. of mercury. Boiling points, unless otherwise noted, were taken at atmospheric pressure.

Example I

This example shows a typical preparation of sodium silicide and an embodiment of the invention in which silicon tetrachloride, ethylene and sodium silicide are reacted together.

(a) A reaction tube is prepared which consists of a six-inch section of 3/4" stainless steel pipe with a cap threaded to the bottom. The cap for the top end of the tube is a 3/4" pipe cap to which one end of a stainless steel tube 1/4" in diameter and 8" long is welded. The reaction tube is purged with nitrogen gas and charged with 8 grams of sodium metal and 20 grams of silicon powder. The cap with the stainless steel exit tube is then attached and the reaction vessel suspended in a 2" by 12" tube furnace. A rubber tube serves to connect the stainless steel exit tube to a glass T-tube, one leg of which is attached to a gas bubbler filled with white oil, the other, to a nitrogen tank. The nitrogen flow is adjusted until a slow stream of bubbles appears in the white oil. The tube is heated at 700° C. for twenty-four hours, cooled to 600° C., maintained at 600° C. for twenty-four hours, and then cooled to room temperature. The tube is removed from the furnace, the top cap removed and benzene added to the contents. The product, sodium silicide, is transferred to a receptacle and kept under benzene until used. The product is a gray-black solid which reacts readily with water.

(b) Two hundred and ninety-six (296) parts of silicon tetrachloride and 20.4 parts of sodium silicide were placed in a stainless steel shaker tube (capacity, 400 parts of water). Ethylene gas was pressured into the reaction tube and the latter heated to 225° C. at 500 atmospheres pressure for sixteen hours. The reaction mass was filtered to remove solid material. The liquid filtrate containing the alkylchlorosilanes was distilled with the following results:

| Fraction | Boiling Point, °C. | Yield of Product, parts |
|---|---|---|
| A | 54–60 | 114.0 |
| B | 124–133 | 8.7 |
| C | 140–170 | 7.4 |
| D | Residue | 35.0 |

Fraction A was shown to be unreacted silicon tetrachloride. Fraction B was identified by infrared spectra as a mixture of ethyltrichlorosilane and diethyldichlorosilane, composed of 12.18% carbon, 3.30% hydrogen, 64.53% chlorine, and 16.39% silicon. Fraction C contained alkylchlorosilanes with alkyl chains more than two carbon atoms in length.

The residue, fraction D, which comprised 68.5% of the total product, was a viscous liquid found by analysis to contain 71.48% carbon, 11.98% hydrogen, 11.34% chlorine, and 4.73% silicon, and to have a molecular weight of 625. These data show that the liquid is a mixture of long-chain alkylchlorosilanes whose average composition corresponds to the formula $C_{37}H_{75}SiCl_2$. The viscous liquid was readily soluble in ether, benzene, and other organic solvents.

Example II

This example shows the reaction between methyltrichlorosilane, ethylene, and sodium silicide.

Two hundred and twenty (220) parts of methyltrichlorosilane, 75 parts of ethylene, and 20 parts of sodium silicide were reacted in a stainless steel bomb at 250° C. and autogenous pressure for sixteen hours. Distillation of the reaction product yielded 34.9 parts of a mixture of alkylchlorosilanes boiling from 105° C. to 185° C. The residue, boiling above 185° C., weighed 27.3 parts and had the following composition: C, 79.45%; H, 13.18%; Cl, 3.33%; Si, 3.24%; molecular weight, 495.

Example III

This example shows the reaction between dimethyldichlorosilane, ethylene, and sodium silicide.

Dimethyldichlorosilane, ethylene, and sodium silicide were reacted in the same proportions and under the same conditions as in Example II. A mixture of alkylchlorosilanes was obtained that weighed 5.3 parts and boiled from 145° to 155° C. at 10 mm. pressure. The residue, boiling above 155° C. at 10 mm., weighed 33 parts and had the following composition: C, 79.51%; H, 13.22%; Si, 4.04%; Cl, 3.21%; molecular weight, 740.

Example IV

This example shows the reaction between trimethylchlorosilane, ethylene, and sodium silicide.

Trimethylchlorosilane, ethylene, and sodium silicide were reacted in the same proportions and under the same conditions as in Example II. The reaction product yielded a mixture of alkylchlorosilanes weighing six parts and boiling from 90° to 115° C. at 10 mm. pressure. A liquid residue, boiling above 115° C. at 10 mm. pressure, was also obtained which weighed 32 parts and had the following composition: C, 81.84%; H, 13.74%; Si, 2.86%; Cl, 1.84%; molecular weight, 2140.

Example V

This example, in effect, shows the increase in chain length with reaction time.

Example I discloses that the reaction of ethylene with silicon tetrachloride and sodium silicide yields, in addition to the major product of high boiling alkylchlorosilanes, a small amount of alkylchlorosilanes boiling from about 120° to 170° C. One hundred (100) parts of these alkylchlorosilanes, accumulated from several runs, 75 parts of ethylene, and 20 parts of sodium silicide were reacted at 250° C. and autogenous pressure for sixteen hours. Distillation of the reaction mixture yielded 65.5 parts of the starting material and 26.3 parts of a liquid residue which boiled above 180° C. Analysis of this residue gave the following data: C, 79.62%; H, 13.17%; Si, 3.29%; Cl, 4.62%; molecular weight, 481.

*Example VI*

This example shows the reaction between silicon tetrachloride, propylene, and sodium silicide.

Two hundred and twenty (220) parts of silicon tetrachloride, 75 parts of propylene, and 20 parts of sodium silicide were reacted at 300° C. and autogenous pressure for sixteen hours. Distillation of the liquid reaction product yielded 122 parts of unreacted silicon tetrachloride, 10.5 parts of mixed alkylchlorosilanes boiling from 100° to 180° C., and 21.1 parts of a liquid residue boiling above 180° C. Analysis of the residue gave the following results: C, 80.45%; H, 13.39%; Cl, 3.66%; Si, 2.73%.

*Example VII*

This example shows the employment of titanium tetrachloride in the process of the invention.

One hundred and seventy (170) parts of titanium tetrachloride and 20 parts of sodium silicide were placed in a 400 ml. stainless steel tube and ethylene gas pressured into the tube for sixteen hours while it was heated at 225° C. and 500 atmospheres pressure. Distillation of the reaction mixture yielded 42.2 parts of alkylchlorosilanes boiling from 150° C. at atmospheric pressure to over 123° C. at 0.8 mm. pressure. A fraction, boiling at 53° to 123° C. at 0.8 mm., was analyzed and gave the following data: C, 85.31%; H, 13.82%; Si, 1.28%; and Cl, 1.32%.

*Example VIII*

This example shows the substitution of calcium silicide for sodium silicide in the process of the invention.

Two hundred and twenty (220) parts of silicon tetrachloride, 75 parts of ethylene, and 20 parts of calcium silicide were reacted as in Example I at 250° C. and autogenous pressure for sixteen hours. A yield of 24 parts of alkylchlorosilanes, boiling from 120° C. to over 170° C. was obtained with the composition: C, 81.03%; H, 13.56%; Cl, 4.75%; Si, 2.55%. The molecular weight of this product was 610.

*Example IX*

This example shows the use of magnesium silicide rather than sodium silicide in the invention.

The process was run as in Example VIII, using magnesium silicide instead of calcium silicide. A yield of 13 parts of alkylchlorosilanes, boiling from 120° C. to over 170° C., was obtained. The product had the following analysis: C, 82.88%; H, 13.91%; Cl, 3.30%; and Si, 2.27%.

*Example X*

This example shows that the long-chain alkylchlorosilanes prepared by the methods given are effective agents for waterproofing masonry materials.

An ordinary building brick was sawed into eight pieces which were approximately 2-inch cubes, each cube having an unsawed surface which in the parent brick in a building would normally be exposed to the weather. This surface was brushed with a 4% solution of an alkylchlorosilane in toluene, the silane having an average molecular formula of $C_{37}H_{75}SiCl_2$. The treated side of the cube was sealed to one end of a hollow glass cylinder 14 inches long by 1.2 inches in diameter and open at both ends, a molten 1:1 beeswax:rosin mixture being used as the cement. A control cube was prepared for test at the same time. After three hours water was poured to a height of 12 inches in each cylinder in a vertical position resting on the brick base. The drop in water levels after twenty-four hours was used as a measure of waterproofness. The following results were obtained:

| Treating Agent | Drop in Water Level, Inches |
|---|---|
| None | 11½ |
| $C_{37}H_{75}SiCl_2$ | 2 |

The alkylchlorosilanes are also useful in waterproofing paper and as treating agents for canvas and leather.

It will be seen that the process of the invention has several advantages, generally paralleling the objects. Thus by means of it, readily available, lower olefins are transformed into high molecular weight, long-chain alkylhalosilanes. The process is also simple and easily operated and does not produce hazardous by-products. Finally, the process has the distinct advantage of producing long-chain alkylhalosilanes which have not been prepared by any previously-known processes.

The embodiments of the invention in which an exclusive property or privilege is claimed are defined as follows:

1. The method of producing organohalosilanes which consists of reacting, at a temperature of at least 225° C. and a pressure of at least 150 atmospheres, (1) an olefinic hydrocarbon having a single point of ethylenic unsaturation, (2) the silicide of a member of the group consisting of the alkali and alkaline earth metals, and (3) a compound of the formula $MX_nR_{4-n}$ where M is an element of the group consisting of silicon, titanium, zirconium, germanium and tin X is a halogen of atomic number, 17 to 53, inclusive, R is a hydrocarbon radical having 1-6 carbon atoms, and $n$ is an integer from 1 to 4, inclusive.

2. The method of claim 1 in which the olefinic hydrocarbon is cyclic.

3. The method of claim 1 in which the temperature is about 225–400° C.

4. The method of claim 1 in which the pressure is about 200–500 atmospheres.

5. The method of claim 1 in which the olefinic hydrocarbon possesses 2–8 carbon atoms.

6. The method of claim 1 in which the silicide is sodium silicide.

7. The method of claim 1 in which the silicide is calcium silicide.

8. The method of claim 1 in which the silicide is magnesium silicide.

9. The method of claim 1 employing silicon tetrachloride.

10. The method of claim 1 employing titanium tetrachloride.

References Cited in the file of this patent

UNITED STATES PATENTS

| | | |
|---|---|---|
| 2,406,671 | Diamond | Aug. 27, 1946 |
| 2,413,050 | Hyde | Dec. 24, 1946 |
| 2,532,430 | Strother et al. | Dec. 5, 1950 |
| 2,710,875 | Daudt | June 14, 1955 |

FOREIGN PATENTS

| | | |
|---|---|---|
| 859,164 | Germany | Dec. 11, 1952 |
| 702,349 | Great Britain | Jan. 13, 1954 |

OTHER REFERENCES

Kautsky et al.: "Berichte der Deutschen Chemischen Gesellschaft," vol. 86 (1953), pages 1226–34.